United States Patent
Kurani

(10) Patent No.: US 9,781,601 B1
(45) Date of Patent: Oct. 3, 2017

(54) SYSTEMS AND METHODS FOR DETECTING POTENTIALLY ILLEGITIMATE WIRELESS ACCESS POINTS

(71) Applicant: Symantec Corporation, Mountain View, CA (US)

(72) Inventor: Ankit Kurani, Pune (IN)

(73) Assignee: Symantec Corporation, Mountain View, CA (US)

(*) Notice: Subject to any disclaimer, the term of this patent is extended or adjusted under 35 U.S.C. 154(b) by 53 days.

(21) Appl. No.: 14/732,811

(22) Filed: Jun. 8, 2015

(51) Int. Cl.
- *H04W 12/08* (2009.01)
- *H04W 12/12* (2009.01)
- *H04L 29/06* (2006.01)
- *H04W 40/24* (2009.01)

(52) U.S. Cl.
CPC ............. *H04W 12/08* (2013.01); *H04L 63/08* (2013.01); *H04W 12/12* (2013.01); *H04W 40/246* (2013.01)

(58) Field of Classification Search
CPC ... H04W 12/08; H04W 12/12; H04W 40/246; H04L 63/08
See application file for complete search history.

(56) References Cited

U.S. PATENT DOCUMENTS

| | | | |
|---|---|---|---|
| 8,191,143 B1 * | 5/2012 | Lin | H04L 63/1416 713/153 |
| 8,606,219 B1 | 12/2013 | Barbee et al. | |
| 8,844,041 B1 * | 9/2014 | Kienzle | H04L 41/12 709/224 |
| 9,420,513 B1 | 8/2016 | Yalagandula et al. | |
| 2003/0219008 A1 | 11/2003 | Hrastar | |
| 2003/0233567 A1 | 12/2003 | Lynn et al. | |
| 2004/0117624 A1 | 6/2004 | Brandt et al. | |
| 2004/0236547 A1 | 11/2004 | Rappaport et al. | |
| 2005/0111466 A1 * | 5/2005 | Kappes | H04L 63/08 370/400 |
| 2006/0193284 A1 | 8/2006 | Stieglitz et al. | |

(Continued)

OTHER PUBLICATIONS

Justin Harmon; Systems and Methods for Detecting Potentially Illegitimate Wireless Access Points; U.S. Appl. No. 14/608,218, filed Jan. 29, 2015.

(Continued)

*Primary Examiner* — Hadi Armouche
*Assistant Examiner* — Cheng-Feng Huang
(74) *Attorney, Agent, or Firm* — FisherBroyles LLP

(57) ABSTRACT

The disclosed computer-implemented method for detecting potentially illegitimate wireless access points may include (1) determining that a computing device has established a connection with a wireless access point that resembles a known wireless access point, (2) collecting a set of network details related to a route from the computing device to a network resource via the wireless access point, (3) identifying a previously collected set of network details related to a route from the computing device to the network resource via the known wireless access point, (4) determining that a portion of the set of network details related to the route via the wireless access point does not match the set of network details related to the route via the known wireless access point, and then (5) determining that the wireless access point is potentially illegitimate.

19 Claims, 6 Drawing Sheets

(56) References Cited

U.S. PATENT DOCUMENTS

| | | | |
|---|---|---|---|
| 2006/0200862 A1 | 9/2006 | Olson et al. | |
| 2007/0079376 A1 | 4/2007 | Robert et al. | |
| 2007/0153763 A1 | 7/2007 | Rampolla et al. | |
| 2007/0283042 A1 | 12/2007 | West et al. | |
| 2010/0172259 A1 | 7/2010 | Aggarwal et al. | |
| 2010/0207732 A1 | 8/2010 | Patwari et al. | |
| 2011/0051658 A1* | 3/2011 | Jin | G01S 19/48 370/328 |
| 2011/0116442 A1* | 5/2011 | Caldwell | H04W 12/08 370/328 |
| 2011/0222421 A1* | 9/2011 | Jana | H04L 63/1441 370/252 |
| 2011/0261787 A1* | 10/2011 | Bachmann | H04L 63/029 370/331 |
| 2012/0304297 A1 | 11/2012 | Chung et al. | |
| 2012/0309420 A1 | 12/2012 | Morgan et al. | |
| 2013/0040603 A1* | 2/2013 | Stahlberg | H04L 63/126 455/410 |
| 2013/0086644 A1* | 4/2013 | Bahn | H04L 12/2818 726/4 |
| 2013/0217358 A1 | 8/2013 | Snider | |
| 2013/0217411 A1 | 8/2013 | Croy et al. | |
| 2014/0201808 A1* | 7/2014 | Yada | H04W 48/04 726/1 |
| 2014/0304770 A1 | 10/2014 | Jung | |
| 2014/0375431 A1* | 12/2014 | Cristache | G01S 13/876 340/10.1 |
| 2014/0378059 A1 | 12/2014 | Ouchi | |
| 2015/0024787 A1 | 1/2015 | Ben-Itzhak et al. | |
| 2015/0264051 A1* | 9/2015 | Hoggan | H04L 63/0892 726/1 |
| 2015/0281385 A1* | 10/2015 | Sugaya | G06F 17/30241 707/736 |
| 2015/0296450 A1* | 10/2015 | Koo | H04W 24/04 455/435.3 |
| 2016/0029217 A1 | 1/2016 | Yoo | |
| 2016/0149935 A1 | 5/2016 | Liu et al. | |
| 2016/0192136 A1 | 6/2016 | Pan et al. | |
| 2016/0316426 A1 | 10/2016 | Kumar | |

OTHER PUBLICATIONS

Michael Shavell, et al; Systems and Methods for Detecting Illegitimate Devices on Wireless Networks; U.S. Appl. No. 14/616,763, filed Feb. 9, 2015.

Michael Shavell, et al; Systems and Methods for Detecting Illegitimate Devices on Wireless Networks; U.S. Appl. No. 14/616,761, filed Feb. 9, 2015.

Justin Harmon; Systems and Methods for Detecting Potentially Illegitimate Wireless Access Points; U.S. Appl. No. 14/625,075, filed Feb. 18, 2015.

Lim, Kwontaek et al., "Scheme of Rogue AP detection in managed WLAN based on AP's location", http://xuebao.nuc.edu.cn/new/english.php?id=85&tid=646, as accessed Dec. 3, 2014, Journal of Measurement Science and Instrumentation, vol. 3 No. 4, Sum No. 12, (Dec. 2012).

Lim, Kwontaek et al., "Scheme of Rogue AP detection in managed WLAN based on AP's location", http://xuebao.nuc.edu.cn/new/uploads/File/jmsi2012-4-370.pdf, as accessed Dec. 3, 2014, Journal of Measurement Science and Instrumentation, vol. 3 No. 4, Sum No. 12, (Dec. 2012), pp. 370-373.

"WiFi Pineapple", https://www.wifipineapple.com/, as accessed Dec. 3, 2014, (Sep. 26, 2011).

"Smart WiFi Toggler", https://play.google.com/store/apps/details?id=com.sebouh00.smartwifitoggler&hl=en, as accessed Dec. 3, 2014, (Dec. 13, 2012).

"Coordinate Distance Calculator", http://boulter.com/gps/distance/?from=38.2500%B0+N%2C+85.7667%B0+W&to=38.0297%B0+N%2C+84.4947%B0+W&units=m, as accessed Dec. 3, 2014, (On or before Dec. 3, 2014).

"802.11 WLAN Packet Types", http://www.wildpackets.com/resources/compendium/wireless_lan/wlan_packet_types, as accessed Dec. 3, 2014, WildPackets, Inc., (Apr. 15, 2010).

"Wireless access point", http://en.wikipedia.org/wiki/Wireless_access_point, as accessed Dec. 3, 2014, Wikipedia, (Apr. 14, 2004).

"Stop connecting to a particular wifi network based on my location", http://android.stackexchange.com/questions/83925/stop-connecting-to-a-particular-wifi-network-based-on-my-location, as accessed Dec. 3, 2014, (Oct. 2, 2014).

"How to block apps on tablet from accessing the Internet while on tethering", http://android.stackexchange.com/questions/63987/how-to-block-apps-on-tablet-from-accessing-the-internet-while-on-tethering, as accessed Dec. 3, 2014, (Feb. 21, 2014).

Cipriani, Jason, "Stop Android 4.3 from always scanning for Wi-Fi networks", http://www.cnet.com/how-to/stop-android-4-3-from-always-scanning-for-wi-fi-networks/, as accessed Dec. 3, 2014, (Aug. 2, 2013).

Boubina Dr, "How to Disable Wifi Auto Connect on iPhone", https://snapguide.com/guides/disable-wifi-auto-connect-on-iphone/, as accessed Dec. 3, 2014, (Jul. 22, 2012).

"LG G3—WiFi Auto-On Issue", https://support.t-mobile.com/thread/75809, as accessed Dec. 3, 2014, (Aug. 7, 2014).

"Best Practices for Rogue Detection and Annihilation", http://airmagnet.flukenetworks.com/assets/whitepaper/Rogue_Detection_White_Paper.pdf, as accessed Dec. 3, 2014, A Technical Whitepaper, AirMagnet, Inc., (Nov. 2004).

"How do you prevent rogue wireless access points on a network?", http://networkengineering.stackexchange.com/questions/123/how-do-you-prevent-rogue-wireless-access-points-on-a-network, as accessed Dec. 3, 2014, (May 8, 2013).

K. N., Gopinath et al., "All You Wanted to Know About WiFi Rogue Access Points", http://www.rogueap.com/rogue-ap-docs/RogueAP-FAQ.pdf, as accessed Dec. 3, 2014, AirTight Networks, Inc., (2009).

"Rogue access point", http://en.wikipedia.org/wiki/Rogue_access_point, as accessed Dec. 3, 2014, Wikipedia, (Oct. 22, 2005).

"Rogue access points: Preventing, detecting and handling best practices", http://searchnetworking.techtarget.com/Rogue-access-points-Preventing-detecting-and-handling-best-practices, as accessed Dec. 3, 2014, TechTarget, (May 2009).

"Tracking down a rogue access point", http://security.stackexchange.com/questions/10783/tracking-down-a-rogue-access-point, as accessed Dec. 9, 2014, (Jan. 18, 2012).

"Traceroute", https://en.wikipedia.org/wiki/Traceroute, as accessed Dec. 9, 2014, Wikipedia, (Feb. 24, 2004).

Hunt, Troy, "The beginners guide to breaking website security with nothing more than a Pineapple", http://www.troyhunt.com/2013/04/the-beginners-guide-to-breaking-website.html, as accessed Dec. 9, 2014, (Apr. 17, 2013).

Michael Shavell, et al.; Systems and Methods for Detecting Illegitimate Devices on Wireless Networks; U.S. Appl. No. 14/617,245, filed Feb. 9, 2015.

"Why don't wifi managers remember mac addresses for hotspots to defeat the jasager attack?", http://security.stackexchange.com/questions/14854/why-dont-wifi-managers-remember-mac-addresses-for-hotspots-to-defeat-the-jasage, as accessed Dec. 9, 2014, (May 10, 2012).

"7. MAC Frame Formats", http://grouper.ieee.org/groups/802/15/pub/2001/Jul01/01292r1P802-15_TG3-Proposed-Changes-to-Frame-Formats.pdf, as accessed Dec. 9, 2014, (2001).

"Frame check sequence", http://en.wikipedia.org/wiki/Frame_check_sequence, as accessed Dec. 9, 2014, Wikipedia, (Apr. 5, 2005).

"Service set (802.11 network)", http://en.wikipedia.org/wiki/Service_set_%28802.11_network%29, as accessed Dec. 9, 2014, Wikipedia, (Jul. 10, 2009).

"Part 11: Wireless LAN Medium Access Control (MAC) and Physical Layer (PHY) Specifications", http://standards.ieee.org/getieee802/download/802.11-2012.pdf, as accessed Dec. 9, 2014, IEEE Std 802.11™-2012 (Revision of IEEE Std 802.11-2007), IEEE Computer Society, New York, (Feb. 6, 2012).

Dai Zovi, Dino A., "KARMA Attacks Radioed Machines Automatically", http://theta44.org/karma/, as accessed Dec. 9, 2014, (Jan. 17, 2006).

(56) References Cited

OTHER PUBLICATIONS

Girsas, Paul, "Wifi Radar", https://play.google.com/store/apps/details?id=girsas.wifiradar&hl=en, as accessed Jan. 16, 2015, (Dec. 24, 2013).
"Chapter 6—Configuring Radio Setting", http://www.cisco.com/c/en/us/td/docs/wireless/access_point/12-4_10b_JA/configuration/guide/scg12410b/scg12410b-chap6-radio.html, as accessed Jan. 16, 2015, Cisco, (On or before Sep. 15, 2014).
"Chapter 9—Configuring an Access Point as a Local Authenticator", http://www.cisco.com/c/en/us/td/docs/wireless/access_point/12-4_10b_JA/configuration/guide/scg12410b/scg12410b-chap9-localauth.html, as accessed Jan. 16, 2015, Cisco, (On or before Sep. 6, 2014).
"WLA Series Wireless LAN Access Points", https://www.juniper.net/assets/us/en/local/pdf/datasheets/1000359-en.pdf, as accessed Jan. 16, 2015, Data Sheet, Juniper Networks, Inc., (Jun. 2013).
"Aruba 100 Series Access Points", http://www.arubanetworks.com/assets/ds/DS_AP100Series.pdf, as accessed Jan. 16, 2015, Data Sheet, Aruba Networks, Inc., (On or before Jan. 16, 2015).
Notenboom, Leo A., "How can I block neighboring wireless networks?", http://ask-leo.com/how_can_i_block_neighboring_wireless_networks.html, as accessed Jan. 16, 2015, (Jan. 30, 2007).
Roos, Dave, "How Wireless Mesh Networks Work", http://computer.howstuffworks.com/how-wireless-mesh-networks-work.htm, as accessed Jan. 16, 2015, (Dec. 4, 2008).
Leslie, David, "Rogue Wireless Access Point Detection and Remediation", http://www.giac.org/paper/gsec/4060/rogue-wireless-access-point-detection-remediation/106460, as accessed Jan. 16, 2015, Global Information Assurance Certification Paper, SANS Institute 2004, (Sep. 9, 2004).
Pacchiano, Ronald, "How to Track Down Rogue Wireless Access Points", http://www.smallbusinesscomputing.com/webmaster/article.php/3590656/How-to-Track-Down-Rogue-Wireless-Access-Points.htm, as accessed Jan. 16, 2015, (Mar. 10, 2006).
"Rogue Detection under Unified Wireless Networks", http://www.cisco.com/c/en/us/support/docs/wireless-mobility/wireless-lan-wlan/70987-rogue-detect.html, as accessed Jan. 16, 2015, Document ID: 70987, Cisco, (On or before Sep. 25, 2007).
"Locating Rogue WiFi Access Points", https://www.virtuesecurity.com/blog/locating-rogue-wifi-access-points/, as accessed Jan. 16, 2015, Virtue Security, (Oct. 5, 2013).
"NetSurveyor—802.11 Network Discovery / WiFi Scanner", http://nutsaboutnets.com/netsurveyor-wifi-scanner/, as accessed Jan. 16, 2015, Nuts About Nets, (Nov. 16, 2011).
"Domain Name System", http://en.wikipedia.org/wiki/Domain_Name_System, as accessed Apr. 6, 2015, Wikipedia, (Jan. 23, 2004).
Mitchell, Bradley, "What Is a DNS Server?", http://compnetworking.about.com/od/dns_domainnamesystem/f/dns_servers.htm, as accessed Apr. 6, 2015, (Feb. 19, 2007).
"What is the difference between public and private IP addresses?", http://supportcenter.verio.com/KB/questions.php?questionid=655, as accessed Apr. 6, 2015, Verio Inc., (On or before Apr. 6, 2015).
Michael Shavell, et al; Systems and Methods for Preventing Computing Devices from Sending Wireless Probe Packets; U.S. Appl. No. 14/949,927, filed Nov. 24, 2015.
"802.11 WLAN Packet Types", http://www.wildpackets.com/resources/compendium/wireless_lan/wlan_packet_types, as accessed Oct. 14, 2015, (Apr. 15, 2010).
Michael Shavell, et al.; Systems and Methods for Detecting Network Security Deficiencies on Endpoint Devices; U.S. Appl. No. 15/199,149, filed Jun. 30, 2016.
Captive portal; https://en.wikipedia.org/wiki/Captive_portal, as accessed May 17, 2016; Wikipedia; (Jan. 25, 2005).

\* cited by examiner

SYSTEMS AND METHODS FOR DETECTING POTENTIALLY ILLEGITIMATE WIRELESS ACCESS POINTS

BACKGROUND

Wireless access points may provide users of internet-enabled devices with efficient and/or widespread access to wired network connections. For example, a router within a personal or home network may include a wireless access point that provides wireless Internet service to multiple devices within a home. In addition, an enterprise may provide employees and/or customers with wireless access to a Local Area Network (LAN) by implementing multiple access points throughout a building covered by the LAN. To facilitate an efficient connection to a wireless access point, many computing devices may store the configuration details of the wireless access point after connecting to the wireless access point for the first time. When re-entering the range of the wireless access point, the computing devices may request access to the wireless access point and quickly re-connect.

Unfortunately, traditional technologies for connecting computing devices to wireless access points may have certain security deficiencies that leave the computing devices vulnerable to attack. For example, conventional network security systems may fail to provide any reliable and/or trusted techniques for computing devices to verify the legitimacy and/or identity of wireless access points. As a result, an attacker may configure a malicious device (e.g., a so-called WIFI PINEAPPLE) to mimic the credentials of a wireless access point known to a computing device. The malicious device may then enable the computing device to connect to an illegitimate access point that appears to be the known access point. After the computing device connects to the illegitimate access point, the attacker may view all network traffic sent to and from the computing device.

The instant disclosure, therefore, identifies and addresses a need for improved systems and methods for detecting potentially illegitimate wireless access points.

SUMMARY

As will be described in greater detail below, the instant disclosure describes various systems and methods for detecting potentially illegitimate wireless access points by determining that a computing device has connected to a wireless access point that resembles a known wireless access point but that does not access a certain network resource in the same manner and/or with the same configuration as the known wireless access point.

In one example, a computer-implemented method for detecting potentially illegitimate wireless access points may include (1) determining that a computing device has established a connection with a wireless access point that resembles a known wireless access point to which the computing device has previously connected, (2) in response to determining that the computing device has established the connection with the wireless access point (A) collecting a set of network details related to a route from the computing device to a network resource via the wireless access point and (B) identifying a previously collected set of network details related to a route from the computing device to the network resource via the known wireless access point, (3) determining that at least a portion of the set of network details related to the route from the computing device to the network resource via the wireless access point does not match the set of network details related to the route from the computing device to the network resource via the known wireless access point, and then (4) determining, based at least in part on the portion of the set of network details related to the route from the computing device to the network resource via the wireless access point not matching the set of network details related to the route from the computing device to the network resource via the known wireless access point, that the wireless access point is potentially illegitimate.

In some examples, the method may include determining that the wireless access point broadcasts a network identification string of a network to which the computing device was previously provided access by connecting to the known wireless access point. Additionally, in some embodiments, the method may include determining that a malicious network device is spoofing the known wireless access point.

In some examples, the method may include identifying an Internet Protocol (IP) address of the computing device and/or a Domain Name System (DNS) server that assigns an IP address to the computing device while the computing device is connected to the wireless access point. Additionally or alternatively, the method may include performing a traceroute on the network resource to identify a series of computing devices included in the route from the computing device to the network resource via the wireless access point.

In some embodiments, the method may include generating a signature that identifies the set of network details related to the route from the computing device to the network resource via the known wireless access point. The method may then include storing the signature within the computing device. In these embodiments, the method may also include generating a signature that identifies the set of network details related to the route from the computing device to the network resource via the wireless access point. The method may then include determining that the signature that identifies the set of network details related to the route from the computing device to the network resource via the wireless access point does not match the signature that identifies the set of network details related to the route from the computing device to the network resource via the known wireless access point.

In some examples, the method may further include disconnecting the computing device from the wireless access point in response to determining that the wireless access point is potentially illegitimate. Additionally or alternatively, the method may include warning a user of the computing device that the wireless access point is potentially illegitimate.

In one embodiment, a system for implementing the above-described method may include (1) a connection module that determines that a computing device has established a connection with a wireless access point that resembles a known wireless access point to which the computing device has previously connected, (2) a collection module that, in response to the determination that the computing device has established the connection with the wireless access point, (A) collects a set of network details related to a route from the computing device to a network resource via the wireless access point and (B) identifies a previously collected set of network details related to a route from the computing device to the network resource via the known wireless access point, (3) a comparison module that determines that at least a portion of the set of network details related to the route from the computing device to the network resource via the wireless access point does not match the set of network details related to the route from the computing device to the network resource via the known wireless access point, and (4) a legitimacy module that determines, based at least in part on the portion of the set of network details related to the route from the computing device to the network resource via the wireless access point not matching the set of network details related to the route from the computing device to the network resource via the known wireless access point, that the wireless access point is potentially illegitimate. The method may also include at least one physical processor that executes the connection module, the collection module, the comparison module, and the legitimacy module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) determine that the computing device has established a connection with a wireless access point that resembles a known wireless access point to which the computing device has previously connected, (2) in response to determining that the computing device has established the connection with the wireless access point (A) collect a set of network details related to a route from the computing device to a network resource via the wireless access point and (B) identify a previously collected set of network details related to a route from the computing device to the network resource via the known wireless access point, (3) determine that at least a portion of the set of network details related to the route from the computing device to the network resource via the wireless access point does not match the set of network details related to the route from the computing device to the network resource via the known wireless access point, and (4) determine, based at least in part on the portion of the set of network details related to the route from the computing device to the network resource via the wireless access point not matching the set of network details related to the route from the computing device to the network resource via the known wireless access point, that the wireless access point is potentially illegitimate.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
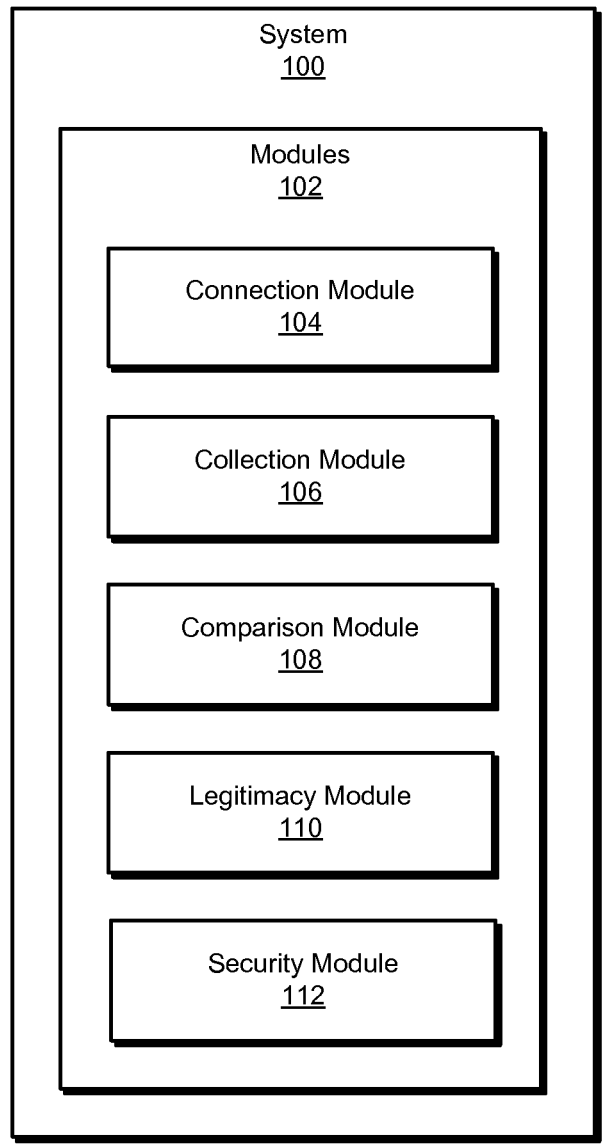
FIG. 1 is a block diagram of an exemplary system for detecting potentially illegitimate wireless access points.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting potentially illegitimate wireless access points. As will be explained in greater detail below, by identifying details related to how a computing device accesses a particular network resource each time the computing device connects to a new wireless access point, the systems and methods described herein may compare network details associated with a wireless access point that appears to be a known wireless access point to which the computing device has previously connected and network details associated with the known wireless access point. By determining that the network details associated with the wireless access point that appears to be the known wireless access point differ from the network details associated with the known wireless access point, the disclosed systems and methods may determine that the wireless access point is potentially illegitimate. For example, the systems and methods described herein may determine that a malicious network device is spoofing the known wireless access point in an attempt to access data distributed by the computing device after unknowingly connecting to an illegitimate access point.

Figure 2:
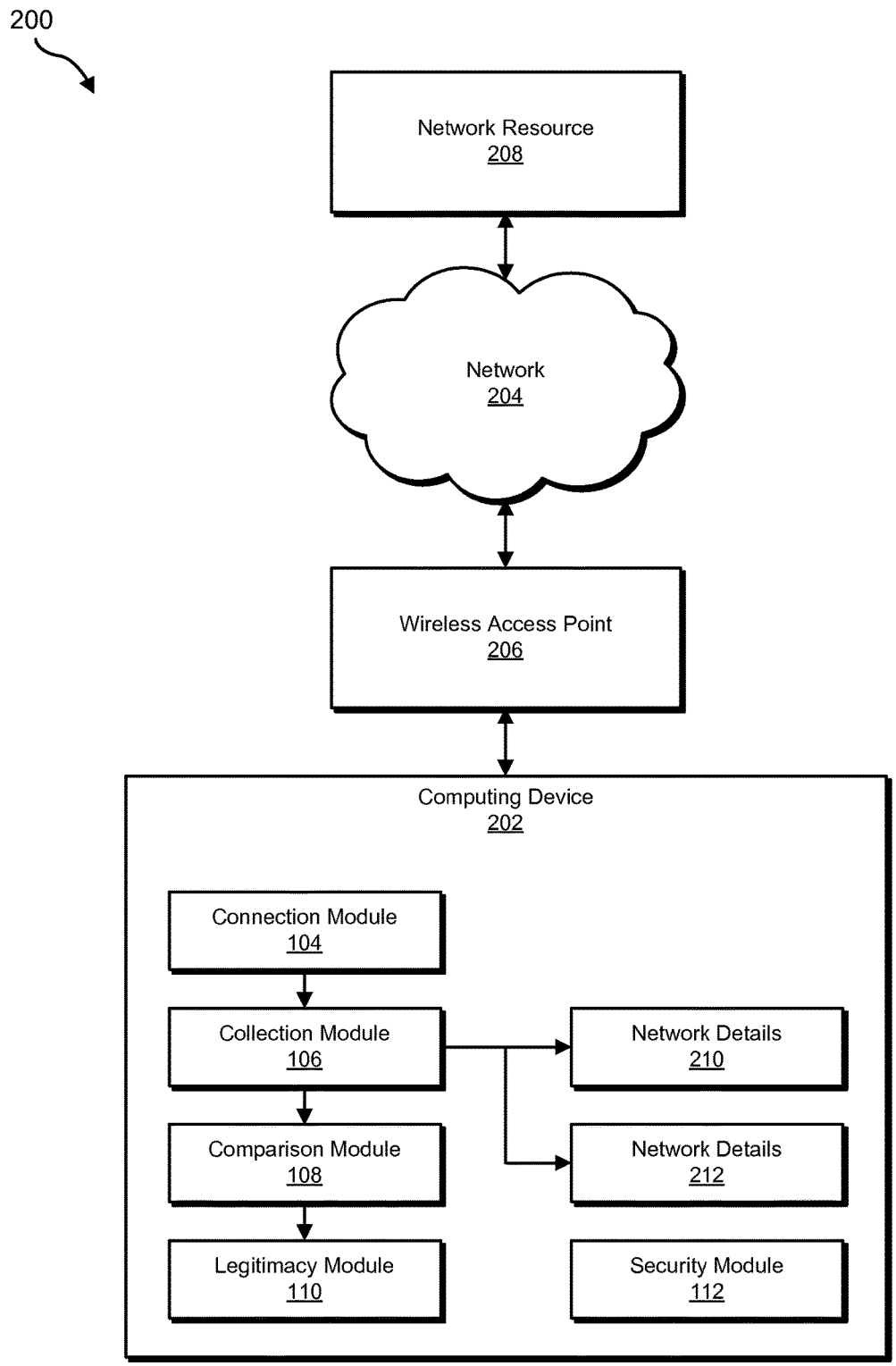
FIG. 2 is a block diagram of an additional exemplary system for detecting potentially illegitimate wireless access points.

The following will provide, with reference to FIGS. 1-2, detailed descriptions of exemplary systems for detecting potentially illegitimate wireless access points. Detailed descriptions of corresponding computer-implemented methods will also be provided in connection with FIG. 3. In addition, detailed descriptions of exemplary sets of network details related to routes from a computing device to a network resource via wireless access points will be provided in connection with FIG. 4. Finally, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting potentially illegitimate wireless access points. As illustrated in this figure, exemplary system 100 may include one or more modules 102 for performing one or more tasks. For example, and as will be explained in greater detail below, exemplary system 100 may include a connection module 104 that determines that a computing device has established a connection with a wireless access point that resembles a known wireless access point to which the computing device has previously connected. Exemplary system 100 may also include a collection module 106 that, in response to the determination that the computing device has established the connection with the wireless access point (1) collects a set of network details related to a route from the computing device to a network resource via the wireless access point and (2) identifies a previously collected set of network details related to a route from the computing device to the network resource via the known wireless access point.

In addition, and as will be described in greater detail below, exemplary system 100 may include a comparison module 108 that determines that at least a portion of the set of network details related to the route from the computing device to the network resource via the wireless access point does not match the set of network details related to the route from the computing device to the network resource via the known wireless access point. Exemplary system 100 may also include a legitimacy module 110 that determines, based at least in part on the portion of the set of network details related to the route from the computing device to the network resource via the wireless access point not matching the set of network details related to the route from the computing device to the network resource via the known wireless access point, that the wireless access point is potentially illegitimate. Finally, exemplary system 100 may include a security module 112 that performs at least one security action in response to the determination that the wireless access point is potentially illegitimate. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in connection with a network 204 via a wireless access point 206. Also as shown in FIG. 2, computing device 202 may be in communication with a network resource 208 via network 204 and/or wireless access point 206. In one example, computing device 202 may be programmed with one or more of modules 102 in order to determine the legitimacy of wireless access point 206.

In one embodiment, one or more of modules 102 from FIG. 1 may, when executed by at least one processor of computing device 202, enable computing device 202 to detect potentially illegitimate wireless access points. For example, and as will be described in greater detail below, connection module 104 may cause computing device 202 to determine that computing device 202 has established a connection with wireless access point 206 that resembles a known wireless access point to which the computing device has previously connected. In response to the determination that computing device 202 has established the connection with wireless access point 206, collection module 106 may cause computing device 202 to collect a set of network details 210 that are related to a route from computing device 202 to network resource 208 via wireless access point 206 and (2) identify a previously collected set of network details 212 that are related to a route from computing device 202 to network resource 208 via the known wireless access point. Next, comparison module 108 may cause computing device 202 to determine that at least a portion of network details 210 does not match network details 212. Finally, legitimacy module 110 may cause computing device 202 to determine that wireless access point 206 is potentially illegitimate based at least in part on the portion of network details 210 not matching network details 212.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Wireless access point 206 generally represents any type or form of physical or virtual network device, system, and/or mechanism that enables computing devices to wirelessly connect to a wired network. In some examples, wireless access point 206 may receive a request from computing device 202 to access wireless access point 206 and/or network 204. Wireless access point 206 may then facilitate the process of connecting computing device 202 to network 204. In some embodiments, wireless access point 206 may reside within a router, switch, or other network device. In other embodiments, wireless access point 206 may represent a separate physical device. Furthermore, and as will be explained in greater detail below, wireless access point 206 may represent and/or be provided by a malicious network device that emulates and/or replicates a particular wireless access point.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, computing device 202 may access network 204 and/or network resource 208 via wireless access point 206.

Network resource 208 generally represents any type or form of online service, content, media, and/or destination that is accessible by a computing device via a network. Examples of network resource 208 include, without limitation, websites, content hosted by websites (e.g., videos, text, images, etc.), domains, online databases, computing devices connected to the Internet, variations of one or more of the same, portions of one or more of the same, combinations of one or more of the same, or any other suitable network resource.

Figure 3:
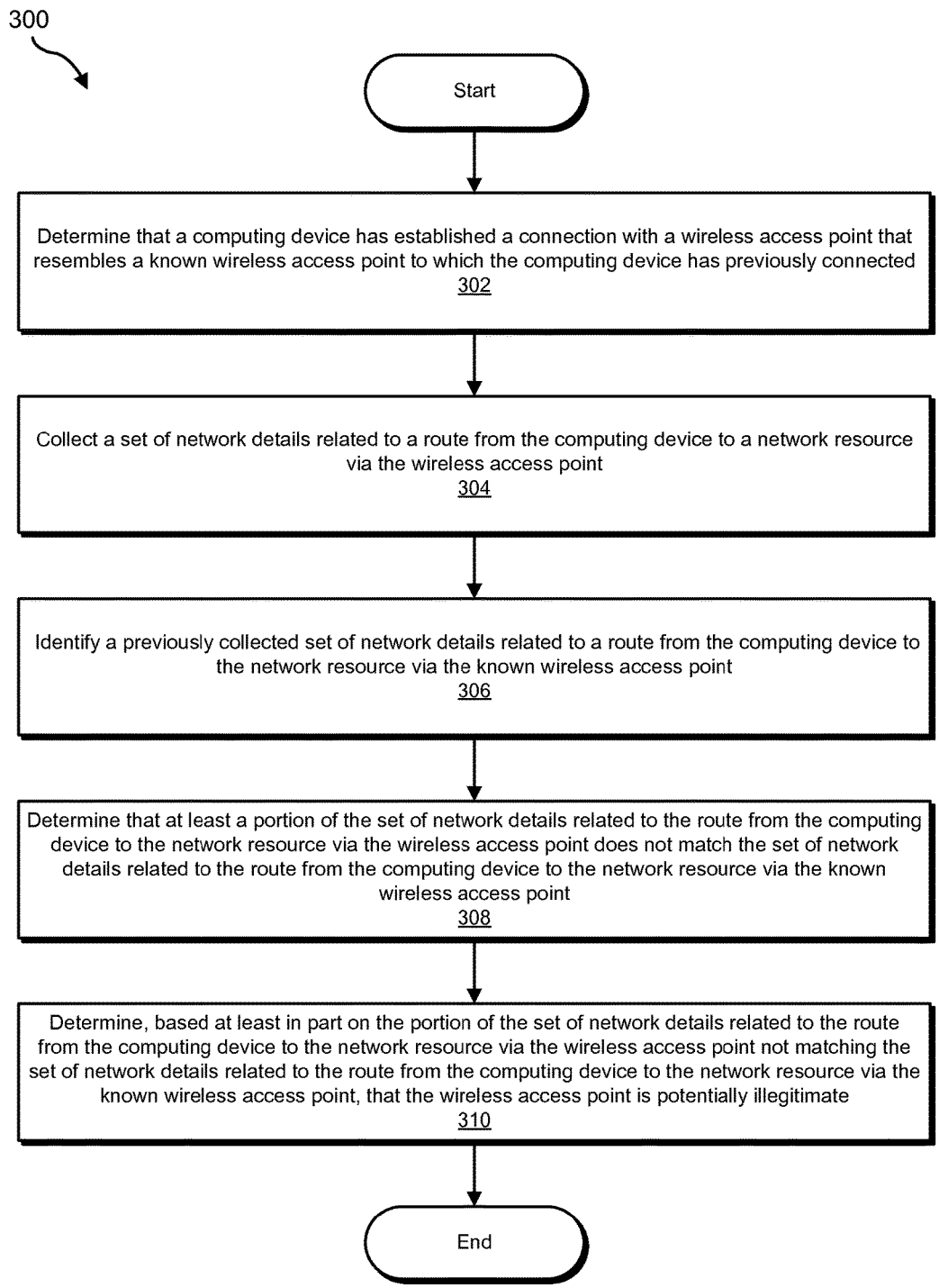
FIG. 3 is a flow diagram of an exemplary method for detecting potentially illegitimate wireless access points.

FIG. 3 is a flow diagram of an exemplary computer-implemented method 300 for detecting potentially illegitimate wireless access points. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may determine that a computing device has established a connection with a wireless access point that resembles a known wireless access point to which the computing device has previously connected. For example, connection module 104 may, as part of computing device 202 in FIG. 2, determine that computing device 202 has established a connection with wireless access point 206. In this example, wireless access point 206 may be spoofing a wireless access point that is known to computing device 202 in an attempt to access data sent to or from computing device 202.

The systems described herein may determine that a computing device has established a connection with a wireless access point that resembles a known wireless access point in a variety of ways. In some examples, connection module 104 may determine that computing device 202 periodically (e.g., every half second, every minute, etc.) transmits requests to connect to wireless access points and/or networks to which computing device 202 has previously connected. For example, when initially establishing a connection to a wireless access point, computing device 202 may store information that identifies the wireless access point and/or the network to which the wireless access point provides access. In particular, computing device 202 may store one or more network identification strings associated with the wireless access point, such as the Basic Service Set IDentifier (BSSID) or Media Access control (MAC) address of the wireless access point and/or the Service Set IDentifier (SSID) of the network to which the wireless access point provides access. Computing device 202 may later include this or any additional information in requests (e.g., probe request frames via 802.11 protocols) to re-connect to the (now known) wireless access point.

In one example, connection module 104 may determine that computing device 202 distributed a request to connect to a known wireless access point. Connection module 104 may then determine that wireless access point 206 broadcasts a network identification string associated with the known wireless access point in response to the request. For example, connection module 104 may determine that computing device 202 received a response (e.g., a probe response frame via an 802.11 protocol) from wireless access point 206 that identifies the BSSID and/or SSID associated with the known wireless access point. Connection module 104 may then determine that computing device 202 establishes a connection with wireless access point 206 after receiving the response indicating that wireless access point 206 is the known wireless access point.

Notably, automatically transmitting such requests may enable computing device 202 to efficiently access familiar networks. However, automatically re-connecting to public and/or unsecure networks may increase the risk of attackers eavesdropping on or gaining access to sensitive information transmitted via the networks. In addition, and as will be explained in greater detail below, automatically distributing requests to access known networks may allow attackers to gain access to sensitive information by generating malicious networks that resemble or claim to be known networks (via, e.g., devices such as the so-called WIFI PINEAPPLE).

Returning to FIG. 3, at step 304 one or more of the systems described herein may collect a set of network details related to a route from the computing device to a network resource via the wireless access point. For example, collection module 106 may, as part of computing device 202 in FIG. 2, collect network details 210.

The term "network detail," as used herein, generally refers to any type or form of setting, property, status, and/or configuration of a network or an element associated with a network, a connection between a computing device and a network, and/or a route between a computing device and a network resource. In some examples, a network detail or set of network details may be unique to a connection between a particular computing device and a particular wireless access point, network, and/or network resource. As such, a set of network details related to a route from a computing device to a network resource via a wireless access point may generally be consistent and/or substantially the same each time the computing device accesses the network resource via the wireless access point.

The systems described herein may collect a set of network details related to a route from a computing device to a network resource in a variety of ways. In some examples, collection module 106 may collect a certain set of network details related to computing device 202 accessing a particular network resource (e.g., www.google.com) each time computing device 202 connects to a new wireless access point and/or network. In exemplary embodiments, collection module 106 may collect a standard set of network details immediately in response to computing device 202 connecting to a new wireless access point in order to more quickly determine whether the wireless access point is illegitimate.

After identifying a set of network details, collection module 106 may store the network details within computing device 202. For example, collection module 106 may store a set of network details within a cache or other fast-access location or storage device of computing device 202 such that the network details may be efficiently retrieved. In addition, collection module 106 may store each set of network details with an identification of the wireless access point and/or network to which the network details are related. For example, collection module 106 may store a BSSID and/or SSID related to each set of network details.

Furthermore, in some examples, collection module 106 may generate and/or store a signature of one or more sets of network details. The term "signature," as used herein, generally refers to any type or form of representation, hash, and/or summary of a portion of data or information. In some embodiments, a signature may combine and/or compress multiple items of data such that the data may be more efficiently stored and/or retrieved. Additionally or alternatively, a signature may encrypt data such that the data is not accessible by unauthorized entities.

In one example, collection module 106 may collect network details 210 in response to computing device 202 establishing a connection with wireless access point 206. In this example, collection module 106 may collect at least a portion of network details 210 by performing a traceroute on network resource 208. The term "traceroute," as used herein, generally refers to any series of computing devices that relay network traffic between an initial computing device and a destination computing device. For example, a traceroute from an initial computing device to a network resource may describe each computing device and/or any properties associated with each computing device that forward network traffic between the initial computing device and a computing device that hosts the network resource. A traceroute may be described using any property of a route and/or computing devices included on a route, such as IP addresses of devices, domain names, and/or the amount of time required for a packet to make a roundtrip from an initial computing device to a device along the route.

Collection module 106 may perform a traceroute on network resource 208 in any suitable manner. In one example, collection module 106 may direct computing device 202 to perform a traceroute on network resource 208 via a command prompt within computing device 202. Additionally or alternatively, collection module 106 may send sequential messages to all or a portion of the devices included on the route from computing device 202 to network resource 208 and then record information about replies from the devices. Furthermore, collection module 106 may not need to identify and/or record each device included on the route from computing device 202 to network resource 208. For example, collection module 106 may only identify the first four or five devices (or any specified number of devices) within the traceroute in order to conserve time and/or computing resources.

In addition to or instead of performing a traceroute on network resource 208, collection module 106 may collect at least a portion of network details 210 by identifying any property associated with a connection between computing device 202 and wireless access point 206 and/or network 204. For example, collection module 106 may identify an IP address of computing device 202 while computing device 202 is connected to wireless access point 206. In one example, collection module 106 may identify a public IP address that identifies computing device 202 to computing devices external to network 204 (e.g., in the event that network 204 represents a local and/or private network). Additionally or alternatively, collection module 106 may identify a private IP address that identifies computing device 202 to computing devices within network 204. In some embodiments, the IP address of computing device 202 may be static (e.g., computing device 202 may receive the same IP address each time it connects to wireless access point 206 and/or network 204). In other examples, the IP address of computing device 202 may be dynamic (e.g., computing device 202 may receive a different IP address each time it connects to wireless access point 206 and/or network 204).

In some examples, computing device 202 may be assigned an IP address by a DNS server. In these examples, collection module 106 may collect at least a portion of network details 210 by identifying a DNS server that assigns an IP address to computing device 202 while computing device 202 is connected to wireless access point 206. The term "DNS server," as used herein, generally refers to any type or form of server, database, or computing device that maps domain names to IP addresses. In one example, an Internet Service Provider (ISP) may maintain one or more DNS servers that assign IP addresses to computing devices each time the computing devices connect to a wireless access point and/or network. In another example, a DNS server may translate a domain name (e.g., "google.com") to an IP address when a user of a computing device requests to access the domain. In some embodiments, a DNS server may be configured to provide IP addresses and/or domain name-to-IP address translations for a certain set of domains and/or for computing devices in a certain geographic region. As such, a computing device may communicate with a particular DNS server each time it connects to a particular network and/or accesses network resources within a particular domain.

Figure 4:
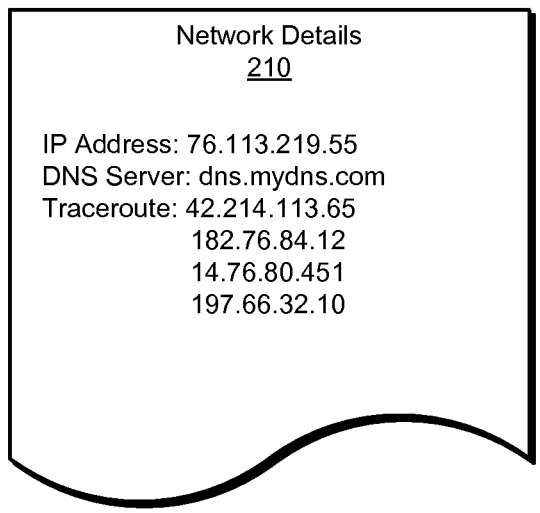
FIG. 4 is an illustration of exemplary sets of network details related to routes from a computing device to a network resource via wireless access points.
Figure 4:
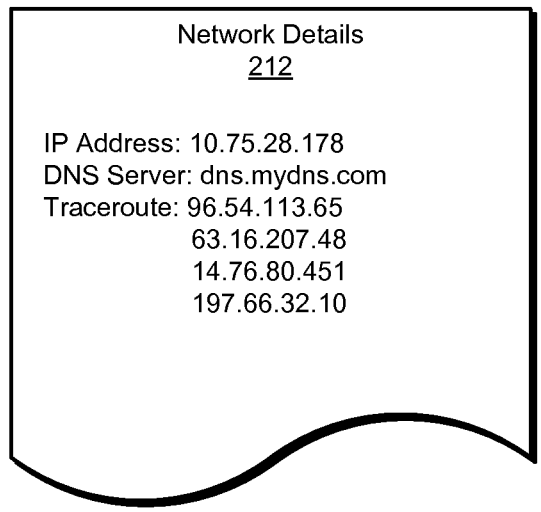

FIG. 4 illustrates a portion of the information that may be included within network details 210. As shown in FIG. 4, network details 210 may include and/or identify an IP address (in this example, "76.113.219.55") assigned to computing device 202 when computing device 202 connected to wireless access point 206. Also as shown in FIG. 4, network details 210 may include and/or identify the name of a DNS server (in this example, "dns.mydns.com") that assigned the IP address to computing device 202 when computing device 202 connected to wireless access point 206. Finally, network details 210 may include and/or identify a traceroute that identifies the IP addresses of the first four devices that forward network traffic between computing device 202 and the device that hosts network resource 208 while computing device 202 is connected to wireless access point 206. In this example, the traceroute may be described by the series of IP addresses "42.214.113.65," "182.76.84.12," "14.76.80.451," and "197.66.32.10." Network details 210 may also include any additional information (although not shown in FIG. 4) that describes how computing device 202 accesses and/or communicates with network resource 208 via wireless access point 206.

Returning to FIG. 3, at step 306 one or more of the systems described herein may identify a previously collected set of network details related to a route from the computing device to the network resource via the known wireless access point. For example, collection module 106 may identify network details 212.

The systems described herein may identify a previously collected set of network details in a variety of ways. As described above, collection module 106 may identify and/or store a set of network details related to a route from computing device 202 to a certain network resource after each time computing device 202 connects to a new wireless access point and/or network. Accordingly, collection module 106 may have previously identified and stored network details 212 in response to connecting to the known wireless access point. In one example, collection module 106 may identify network details 212 within computing device 202 (e.g., by searching for a set of details associated with a BSSID and/or SSID associated with the known wireless access point) in response to identifying network details 210.

FIG. 4 illustrates all or a portion of the information that may be included within network details 212. As shown in FIG. 4, network details 212 may include and/or identify an IP address (in this example, "10.75.28.178") assigned to computing device 202 when computing device 202 connected to the known wireless access point. Also as shown in FIG. 4, network details 212 may include and/or identify the name of a DNS server (in this example, "dns.mydns.com") that assigned the IP address to computing device 202 when computing device 202 connected to the known wireless access point. Finally, network details 212 may include and/or identify a traceroute that identifies the IP addresses of the first four devices that forward network traffic between computing device 202 and the device that hosts network resource 208 while computing device 202 is connected to the known wireless access point. In this example, the traceroute may be described by the series of IP addresses "96.54.113.65," "63.16.207.48," "14.76.80.451," and "197.66.32.10."

Returning to FIG. 3, at step 308 one or more of the systems described herein may determine that at least a portion of the set of network details related to the route from the computing device to the network resource via the wireless access point does not match the set of network details related to the route from the computing device to the network resource via the known wireless access point. For example, comparison module 108 may, as part of computing device 202 in FIG. 2, determine that at least a portion of network details 210 does not match network details 212.

The systems described herein may determine that at least a portion of a set of network details does not match another set of network details in a variety of ways. In one example, comparison module 108 may compare each detail within network details 210 with each corresponding detail of network details 212. Comparison module 108 may then record an indication of whether each detail matches and/or the number of matching details. In the event that collection module 106 generated signatures of network details 210 and network details 212, comparison module 108 may determine whether the signatures match.

As an example, comparison module 108 may compare the sets of network details illustrated within FIG. 4. In this example, comparison module 108 may determine that the IP address within network details 210 (i.e., "76.113.219.55") and the IP address within network details 212 (i.e., "10.75.28.178") do not match. In addition, comparison module 108 may determine that the DNS server within network details 210 (i.e., "dns.mydyns.com") does match the DNS server within network details 212. Finally, comparison module 108 may determine that the traceroute within network details 210 does not match the traceroute within network details 212. Specifically, comparison module 108 may determine that the first two IP addresses within the traceroutes do not match.

Returning to FIG. 3, at step 310 one or more of the systems described herein may determine, based at least in part on the portion of the set of network details related to the route from the computing device to the network resource via the wireless access point not matching the set of network details related to the route from the computing device to the network resource via the known wireless access point, that the wireless access point is potentially illegitimate. For example, legitimacy module 110 may, as part of computing device 202 in FIG. 2, determine that wireless access point 206 is potentially illegitimate based at least in part on the portion of network details 210 not matching network details 212.

The phrase "potentially illegitimate wireless access point," as used herein, generally refers to any type or form of wireless access point that falsely alleges or appears to be another wireless access point. In some examples, an attacker may configure a potentially illegitimate wireless access point to spoof a particular wireless access point known to a computing device by directing the potentially illegitimate wireless access point to identify itself as that particular wireless access point known. However, a potentially illegitimate wireless access point may not necessarily constitute and/or represent an intentionally malicious wireless access point.

The systems described herein may determine that a wireless access point is potentially illegitimate in a variety of ways. In some examples, legitimacy module 110 may determine that, because all or a portion of network details 210 do not match network details 212, wireless access point 206 may not actually be the known wireless access point (despite broadcasting an identification string of the known wireless access point). Accordingly, legitimacy module 110 may determine that an attacker is spoofing the known wireless access point using a malicious network device. Additionally or alternatively, legitimacy module 110 may determine that a nearby malicious device (such as a WIFI PINEAPPLE) is intercepting requests from computing devices to connect to known wireless access points and returning responses that portray an access point disguised by the malicious device as the known access points.

In some embodiments, legitimacy module 110 may determine that wireless access point 206 is potentially illegitimate in the event that a single detail within network details 210 does not match a corresponding detail within network details 212. For example, legitimacy module 110 may require that network details 210 and network details 212 exactly match to determine that wireless access point 206 is actually the known wireless access point. In other embodiments, legitimacy module 110 may determine that wireless access point 206 is potentially illegitimate only in the event that a certain number of details (e.g., two details) or a certain percentage of details (e.g., 25% of the details) within network details 210 do not match details within network details 212. In this way, legitimacy module 110 may account for normal discrepancies between network details 210 and network details 212 that may not indicate that wireless access point 206 is illegitimate. For example, while the IP address of computing device 202 when connected to the known wireless access point may generally be static, an ISP and/or DNS server may occasionally assign computing device 202 a different IP address.

In one example, legitimacy module 110 may determine that wireless access point 206 is potentially illegitimate based on determining that at least two details within network details 210 do not match details within network details 212. Referring to the example of FIG. 4, legitimacy module 110 may determine that wireless access point 206 is potentially illegitimate based on the determination that the IP address and traceroute details within network details 210 do not match the IP address and traceroute details within network details 212.

In response to determining that wireless access point 206 is potentially illegitimate, the systems described herein may provide one or more security services to computing device 202 and/or a user of computing device 202. For example, security module 112 may disconnect computing device 202 from wireless access point 206. In addition, security module 112 may prevent computing device 202 from accessing any nearby networks (e.g., in the event that a malicious network device is spoofing multiple networks). Additionally or alternatively, security module 112 may prompt (via, e.g., a graphical user interface) a user of computing device 202 to manually decide whether to connect to wireless access point 206 despite the risk that wireless access point 206 is potentially malicious. For example, security module 112 may notify the user that wireless access point 206 is potentially illegitimate and thus warn the user that he or she should avoid transmitting sensitive information via wireless access point 206.

As explained above, a computing device may establish an initial connection with a wireless access point. In response to establishing the connection, the computing device may identify one or more network details associated with accessing a particular network resource via the wireless access point. When later connecting to an additional wireless access point that appears to be the initial wireless access point, the computing device may identify an additional set of network details associated with accessing the particular network resource via the additional wireless access point. The computing device may then compare the two sets of network details. In the event that all or a portion of the sets of network details do not match, the computing device may determine that the wireless access point that appears to be the initial wireless access point is potentially illegitimate. Specifically, the computing device may determine that a malicious network device is attempting to disguise the wireless access point as the initial wireless access point. In response, the computing device may perform one or more security actions to mitigate the threat posed by the potentially illegitimate access point.

Figure 5:
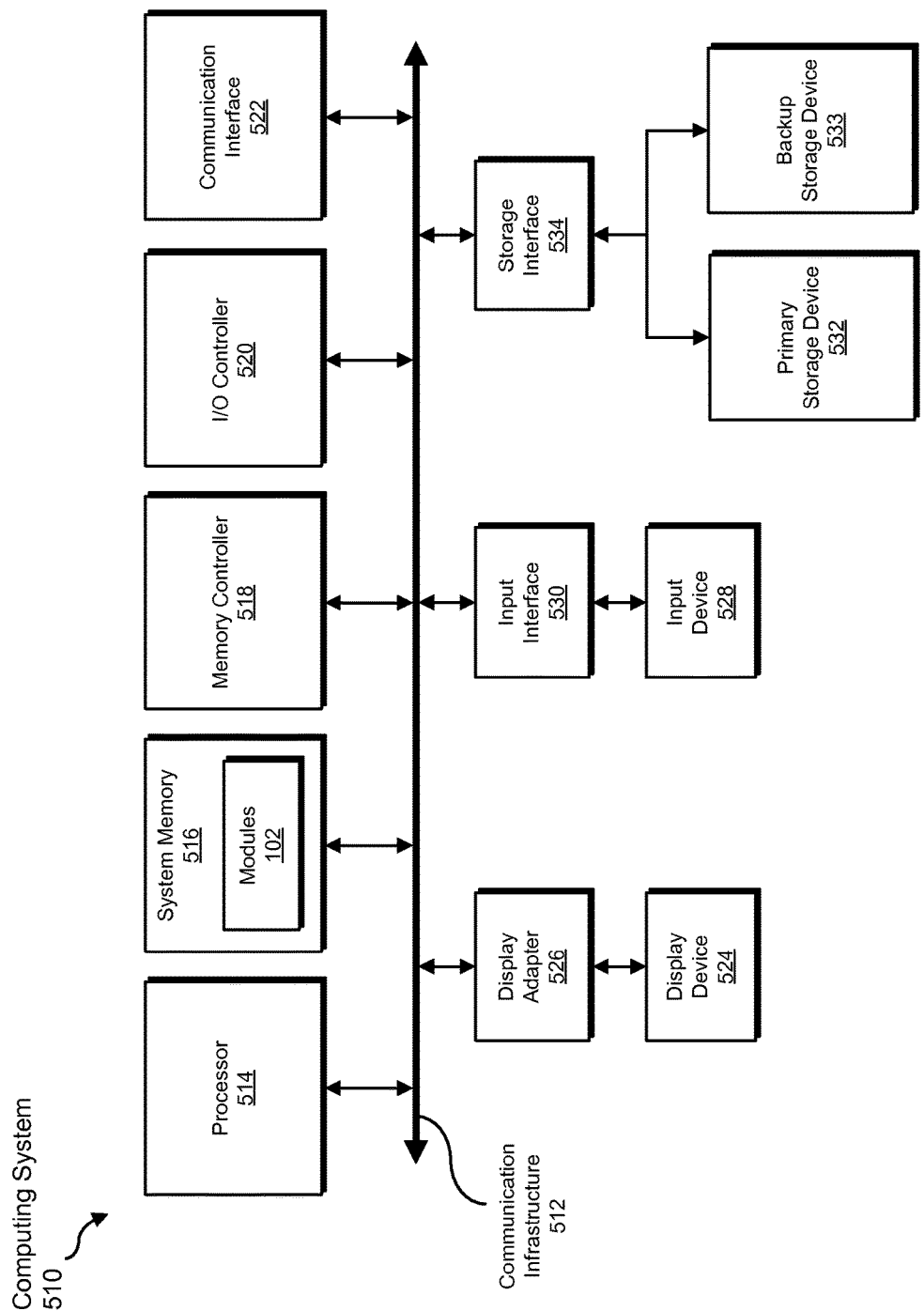
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
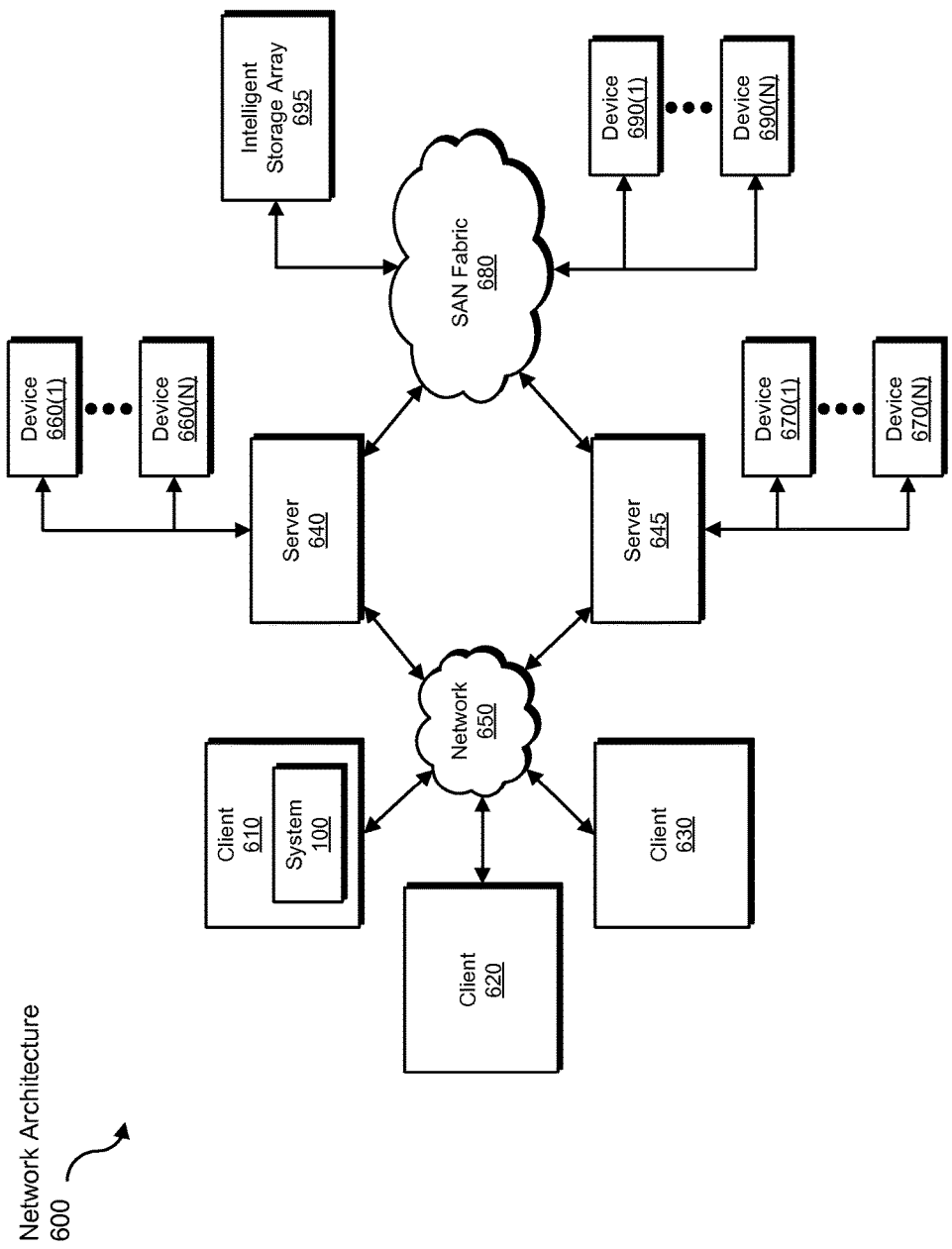
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-

(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting potentially illegitimate wireless access points.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive details about a route from a computing device to a network resource via a wireless access point to be transformed, transform the details about the route into an indication that the wireless access point is potentially illegitimate, output a result of the transformation to a user of the computing device, use the result of the transformation to prevent the computing device from connecting to the wireless access point, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting illegitimate wireless access points, at least a portion of the method being performed by a computing device comprising at least one processor, the method comprising:
    determining that the computing device has established a connection with a wireless access point that resembles a known wireless access point to which the computing device has previously connected;
    performing, in response to determining that the computing device has established the connection with the wireless access point, an authentication process to determine the legitimacy of the wireless access point by:
        identifying a network resource to which the computing device is configured to connect as part of authentication processes to determine the legitimacy of wireless access points,
        establishing, via the wireless access point, a connection between the computing device and the network resource,
        collecting, based on the connection between the computing device and the network resource, a set of network details related to a route from the computing device to the network resource via the wireless access point, the set of network details describing properties of at least one network device that facilitates the connection between the computing device and the network resource, and
        comparing the set of network details related to the route from the computing device to the network resource via the wireless access point with a previously collected set of network details related to a route from the computing device to the network resource via the known wireless access point;
    determining, based on the comparison, that at least a portion of the set of network details related to the route from the computing device to the network resource via the wireless access point does not match the previously collected set of network details related to the route from the computing device to the network resource via the known wireless access point;
    determining that the wireless access point is illegitimate by determining, based at least in part on the portion of the set of network details related to the route from the computing device to the network resource via the wireless access point not matching the previously collected set of network details related to the route from the computing device to the network resource via the known wireless access point, that a malicious network device is spoofing the known wireless access point; and
    performing, in response to determining that the wireless access point is illegitimate, a security action on the computing device to prevent the wireless access point from compromising a security state of the computing device.

2. The method of claim 1, wherein determining that the computing device has established the connection with the wireless access point that resembles the known wireless access point comprises determining that the wireless access point broadcasts a network identification string of a network to which the computing device was previously provided access by connecting to the known wireless access point.

3. The method of claim 1, wherein collecting the set of network details related to the route from the computing device to the network resource via the wireless access point comprises identifying an Internet Protocol (IP) address of the computing device while the computing device is connected to the wireless access point.

4. The method of claim 1, wherein collecting the set of network details related to the route from the computing device to the network resource via the wireless access point comprises identifying a Domain Name System (DNS) server that assigns an IP address to the computing device while the computing device is connected to the wireless access point.

5. The method of claim 1, wherein collecting the set of network details related to the route from the computing device to the network resource via the wireless access point comprises performing a traceroute on the network resource to identify a series of computing devices included in the route from the computing device to the network resource via the wireless access point.

6. The method of claim 1, further comprising:
   generating a signature that identifies the previously collected set of network details related to the route from the computing device to the network resource via the known wireless access point; and
   storing the signature within the computing device.

7. The method of claim 6, wherein determining that the portion of the set of network details related to the route from the computing device to the network resource via the wireless access point does not match the previously collected set of network details related to the route from the computing device to the network resource via the known wireless access point comprises:
   generating a signature that identifies the set of network details related to the route from the computing device to the network resource via the wireless access point; and
   determining that the signature that identifies the set of network details related to the route from the computing device to the network resource via the wireless access point does not match the signature that identifies the previously collected set of network details related to the route from the computing device to the network resource via the known wireless access point.

8. The method of claim 1, wherein the security action comprises disconnecting the computing device from the wireless access point.

9. The method of claim 1, wherein the security action comprises warning a user of the computing device that the wireless access point is illegitimate.

10. A system for detecting illegitimate wireless access points, the system comprising:
   a connection module, stored in memory, that determines that a computing device has established a connection with a wireless access point that resembles a known wireless access point to which the computing device has previously connected;
   a collection module, stored in memory, that performs, in response to the determination that the computing device has established the connection with the wireless access point, an authentication process to determine the legitimacy of the wireless access point by:
      identifying a network resource to which the computing device is configured to connect as part of authentication processes to determine the legitimacy of wireless access points,
      establishing, via the wireless access point, a connection between the computing device and the network resource,
      collecting, based on the connection between the computing device and the network resource, a set of network details related to a route from the computing device to the network resource via the wireless access point, the set of network details describing properties of at least one network device that facilitates the connection between the computing device and the network resource, and
      comparing the set of network details related to the route from the computing device to the network resource via the wireless access point with a previously collected set of network details related to a route from the computing device to the network resource via the known wireless access point;
   a comparison module, stored in memory, that determines, based on the comparison, that at least a portion of the set of network details related to the route from the computing device to the network resource via the wireless access point does not match the previously collected set of network details related to the route from the computing device to the network resource via the known wireless access point;
   a legitimacy module, stored in memory, that determines that the wireless access point is illegitimate by determining, based at least in part on the portion of the set of network details related to the route from the computing device to the network resource via the wireless access point not matching the previously collected set of network details related to the route from the computing device to the network resource via the known wireless access point, that a malicious network device is spoofing the known wireless access point;
   a security module, stored in memory, that performs, in response to the determination that the wireless access point is illegitimate, a security action on the computing device to prevent the wireless access point from harming a security state of the computing device; and
   at least one physical processor configured to execute the connection module, the collection module, the comparison module, the legitimacy module, and the security module.

11. The system of claim 10, wherein the connection module determines that the wireless access point broadcasts a network identification string of a network to which the computing device was previously provided access by connecting to the known wireless access point.

12. The system of claim 10, wherein the collection module identifies an IP address of the computing device while the computing device is connected to the wireless access point.

13. The system of claim 10, wherein the collection module identifies a DNS server that assigns an IP address to the computing device while the computing device is connected to the wireless access point.

14. The system of claim 10, wherein the collection module performs a traceroute on the network resource to identify a series of computing devices included in the route from the computing device to the network resource via the wireless access point.

15. The system of claim 10, wherein after identifying the previously collected set of network details related to the route from the computing device to the network resource via the known wireless access point, the collection module:
   generates a signature that identifies the previously collected set of network details related to the route from the computing device to the network resource via the known wireless access point; and
   stores the signature within the computing device.

16. The system of claim 15, wherein:
   the collection module generates a signature that identifies the set of network details related to the route from the computing device to the network resource via the wireless access point; and
   the comparison module determines that the signature that identifies the set of network details related to the route from the computing device to the network resource via the wireless access point does not match the signature that identifies the previously collected set of network details related to the route from the computing device to the network resource via the known wireless access point.

17. The system of claim 10, wherein the security module disconnects the computing device from the wireless access point.

18. The system of claim 10, wherein the security module warns a user of the computing device that the wireless access point is illegitimate.

19. A non-transitory computer-readable medium comprising one or more computer-executable instructions that, when executed by at least one processor of a computing device, cause the computing device to:
- determine that the computing device has established a connection with a wireless access point that resembles a known wireless access point to which the computing device has previously connected;
- perform, in response to determining that the computing device has established the connection with the wireless access point, an authentication process to determine the legitimacy of the wireless access point by:
  - identifying a network resource to which the computing device is configured to connect as part of authentication processes to determine the legitimacy of wireless access points,
  - establishing, via the wireless access point, a connection between the computing device and the network resource,
  - collecting, based on the connection between the computing device and the network resource, a set of network details related to a route from the computing device to the network resource via the wireless access point, the set of network details describing properties of at least one network device that facilitates the connection between the computing device and the network resource, and
  - comparing the set of network details related to the route from the computing device to the network resource via the wireless access point with a previously collected set of network details related to a route from the computing device to the network resource via the known wireless access point;
- determine, based on the comparison, that at least a portion of the set of network details related to the route from the computing device to the network resource via the wireless access point does not match the previously collected set of network details related to the route from the computing device to the network resource via the known wireless access point;
- determine that the wireless access point is illegitimate by determining, based at least in part on the portion of the set of network details related to the route from the computing device to the network resource via the wireless access point not matching the previously collected set of network details related to the route from the computing device to the network resource via the known wireless access point, that a malicious network device is spoofing the known wireless access point; and
- perform, in response to determining that the wireless access point is illegitimate, a security action on the computing device to prevent the wireless access point from harming a security state of the computing device.

\* \* \* \* \*